(12) United States Patent
Eccleston et al.

(10) Patent No.: US 8,728,323 B2
(45) Date of Patent: May 20, 2014

(54) METHOD OF TREATING CONTAMINATED WATER USING UNEXPANDED INTERCALATED GRAPHITE IN FLAKE FORM

(75) Inventors: Kenneth Thomas Eccleston, Shenstone Litchfield (GB); Amy Jane Eccleston, legal representative, Shenstone Litchfield (GB); June Lilian Richards, legal representative, West Midlands (GB); Nigel Willis Brown, Stoke-on-Trent (GB); Edward P. L. Roberts, Chester (GB)

(73) Assignee: Arvia Technology Limited, Liverpool, Merseyside (GB)

( * ) Notice: Subject to any disclaimer, the term of this patent is extended or adjusted under 35 U.S.C. 154(b) by 0 days.

(21) Appl. No.: 12/425,569

(22) Filed: Apr. 17, 2009

(65) Prior Publication Data

US 2009/0321361 A1 Dec. 31, 2009

Related U.S. Application Data

(63) Continuation of application No. PCT/GB2007/003981, filed on Oct. 18, 2007.

(30) Foreign Application Priority Data

Oct. 20, 2006 (GB) .................................... 0620923

(51) Int. Cl.
*C02F 1/28* (2006.01)
(52) U.S. Cl.
USPC .......................................... 210/670; 210/691
(58) Field of Classification Search
USPC ............... 210/670, 694, 748.01, 691
See application file for complete search history.

(56) References Cited

U.S. PATENT DOCUMENTS

| | | | |
|---|---|---|---|
| 3,357,929 A | 12/1967 | Franciszek | |
| 4,350,576 A | 9/1982 | Watanabe et al. | |
| 5,282,975 A * | 2/1994 | Maryasin et al. | 210/691 |
| 5,308,493 A * | 5/1994 | Mar | 210/635 |
| 5,376,450 A | 12/1994 | Greinke et al. | |
| 6,406,612 B1 | 6/2002 | Greinke | |
| 2006/0049109 A1 * | 3/2006 | Bender et al. | 210/688 |

FOREIGN PATENT DOCUMENTS

| | | |
|---|---|---|
| EP | 0 596 801 | 5/1994 |
| GB | 0 435 766 | 7/1991 |
| JP | 2002154814 | 5/2002 |
| RU | 2117635 | 8/1998 |
| WO | 01/89992 | 11/2001 |
| WO | 2007/125334 | 11/2007 |

OTHER PUBLICATIONS

English language translation of RU 2,117,635 C1 to Smirnov submitted to the USPTO via facsimile by Sarah A. Koffin in Jun. 2, 2011.*
Mohammed et al, Continuous water treatment by adsorption and electrochemcial regeneration, Mar. 2011, Water Research 45 (2011), pp. 3065-3074.*
Brown et al, Atrazine removal using adsorption and electrochemical regeneration, Jul. 2004, Elsevier Ltd, Water Research, vol. 39, pp. 3067-3074.*
Leshin et al., "Electrochemical synthesis of co-intercalation compounds in the graphite-H2SO4-H3PO4 system." Russian Journal of Electrochemistry, 41 (5), 2005.
Shornikova et al., "Graphite intercalation in the graphite-H2S04-R (R-H20, C2H5OH, C2H5COOH) systems." Inorganic Materials, 41 (2), 2005.
Avdeev et al., "Intercalation of sulfuric acid into graphite in the presence of gaseous oxidizers and oleum." Inorganic Materials, 33 (6), 1997.
Brown et al., "Electrochemical regeneration of a carbon-based adsorbent loaded with crystal violet dye." Electrochimica Acta 49 (2004), pp. 3269-3281.
Brown et al., "Atrazine removal using adsorption and electrochemical regeneration." Water Research 38 (2004), pp. 3067-3074.
International Preliminary Report on Patentability for International Patent Application No. PCT/GB2007/003981, mailed Nov. 10, 2008.
International Search Report corresponding to International Patent Application No. PCT/GB2007/003981, mailed Dec. 19, 2007.

* cited by examiner

*Primary Examiner* — Matthew O Savage
(74) *Attorney, Agent, or Firm* — McAndrews, Held & Malloy, Ltd.

(57) ABSTRACT

An adsorbent particulate product for treating contaminated fluid and capable of electrochemical regeneration. The product includes unexpanded intercalated graphite in particulate form, in the form of flakes or in powder form.

4 Claims, No Drawings

METHOD OF TREATING CONTAMINATED WATER USING UNEXPANDED INTERCALATED GRAPHITE IN FLAKE FORM

RELATED APPLICATIONS

This application claims priority to, and is a continuation of International Application No. PCT/GB2007/003981 having an International filing date of Oct. 18, 2007, which is incorporated herein by reference, and which claims priority to Great Britain Patent Application No. 0620923.3 filed Oct. 20, 2006, which is also incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to products for the treatment of contaminated liquid by contact with an adsorbent material. It has particular, but not exclusive application in the treatment of liquids to remove organic pollutants. Products according to the invention are suitable for use in liquid treatment apparatus of the kind described in our International Patent Application No: PCT/GB2007/001544, the entire disclosure whereof is incorporated herein by reference.

BRIEF SUMMARY OF THE INVENTION

Adsorbent materials are commonly used in liquid treatment apparatus. Carbon-based such materials are particularly useful, and are capable of regeneration by the passage of an electric current therethrough. The use of carbon-based adsorbents in the treatment of contaminated water is described in the following papers published by The University of Manchester Institute of Science and Technology (now the University of Manchester) in 2004, incorporated herein by reference:

Electrochemical regeneration of a carbon-based adsorbent loaded with crystal violet dye by N W Brown, E P L Roberts, A A Garforth and R A W Dryfe Electrachemica Acta 49 (2004) 3269-3281

Atrazine removal using adsorption and electrochemical regeneration by N W Brown, E P L Roberts, A Chasiotis, T Cherdron and N Sanghrajka Water Research 39 (2004) 3067-3074

The present invention is concerned particularly with the use of graphite as an adsorbent product for treating contaminated liquids. According to the invention the product comprises unexpanded intercalated graphite in particulate form, preferably powder or flakes. A variety of graphite intercalated compounds (GICs) can be used, but preferred products according to the invention comprise graphite intercalated with a precursor selected from sulphuric acid, phosphoric acid, nitric acid, trifluoroacetic acid and perchloric acid. The preferred precursor is sulphuric acid.

BRIEF DESCRIPTION OF SEVERAL VIEWS OF THE DRAWINGS

[Not Applicable]

DETAILED DESCRIPTION OF THE INVENTION

Unexpanded intercalated graphite in particulate form can exhibit considerably greater electrical conductivity relative to activated carbon of the type commonly used as adsorbent materials in liquid and fluid treatment apparatus and devices. A typical product according to the invention has an electrical conductivity of 5 to 10 times that of activated carbon, enabling rapid electrochemical regeneration relative to the thermal regeneration necessary for activated carbon. Its available surface area is though, considerably less because of the lack of internal pores in the material. We have found that in treatment processes in which the adsorbent is recycled after regeneration, the ease of regeneration more than compensates for the loss of available surface area for adsorbing contaminants. As noted above, products of the invention can be provided in the form of powders or flakes.

Reducing the particle size of the adsorbent material will significantly increase the surface area available for adsorption. However reducing the particle size will make separation of the solid phase more difficult. In the practice of the invention a typical particle size is 0.25-0.75 mm. In powder form a typical mean particle size is in the range 127 to 184 microns, providing a surface area of 2.75 $m^2$ $g^{-1}$. In flake form, the surface area is increased by around 25%. Very fine powders (<50 microns) can be used as the adsorbent material if an organic polymer is used as a flocculent to facilitate separation from the liquid being treated. This organic flocculent is then destroyed by regeneration.

The higher the electrical conductivity of the adsorbent material, the lower will be the voltage required for regeneration and correspondingly the power consumption. Typical individual GIC particles will have electrical conductivities in excess of 10,000 $\Omega^{-1}$ $cm^{-1}$. However in a bed of particles this will be significantly lower as there will be resistance at the particle/particle boundary. Hence it is desirable to use as large a particle as possible to keep the resistance as low as possible. Hence a bed of fine wet particles has been shown to have an electrical conductivity of 0.16 $\Omega^{-1}$ $cm^{-1}$ compared with 0.32 $\Omega^{-1}$ $cm^{-1}$ for a bed of larger particles. As a comparison a bed of granular and powdered activated carbon would typically have electrical conductivities of 0.025 and 0.012 $\Omega^{-1}$ $cm^{-1}$ respectively.

The preferred GIC used in the practice of the invention is in flake form, and typically has a composition of at least 95% carbon, and a density of around 2.225 g $cm^{-3}$. However flake carbons can be used as the starting materials for producing GICs with significantly lower carbon contents (80% or less). These compounds can also be used, but are likely to result in slightly higher voltages at the electrochemical regeneration stage. Other elements will also be present within the GIC, these compounds are dependent on the initial composition of the flake graphite and the chemicals used to convert the flakes into intercalated form. Different sources of graphite can produce GICs with different adsorptive properties.

Whilst the reduction in surface area reduces the adsorptive capacity, the intercalated graphite has been shown to preferentially adsorb certain organic compounds. This is of particular interest as chlorinated organics are preferentially adsorbed over non-chlorinated organic species, with increasing chlorination increasing the preferential removal. This is significant as chlorinated compounds are often more toxic than the non-chlorinated ones. In addition there is preferential removal of high molecular weight and low solubility compounds.

The use of graphite as an absorption agent for liquid materials is well known, and in expanded form it has a very high capacity for absorption. The use of vermicular expanded graphite for this purpose is disclosed in European Patent Specification No: 0 435 766, and U.S. Pat. No. 3,357,929. Graphite intercalation compounds (GICs) are useful in such applications because of their ability to substantially increase their volume under certain conditions. We have, though, found that they can be particularly useful in the treatment of contaminated liquids, in unexpanded particulate form. In this form they are capable of electrochemical regeneration, enabling them to be recycled in a process for treating contaminated liquid in apparatus of the kind described in our application referred to above. While in its unexpanded form the adsorbency capacity of the GICs is reduced, this is balanced by the increased capacity for multiple regeneration after adsorption of contaminants from liquid under treatment. A specific advantage is that its regeneration can be accomplished quite rapidly.

Intercalated graphite compounds have been the subject of considerable research. Reference is directed to the following papers, by way of example:

Electrochemical Synthesis of Co-intercalation Compounds in the Graphite-$H_2SO_4$—$H_3PO_4$ System by V S Leshin, N E Sorokina, and V V Avdeev. Russian Journal of Electrochemistry, Vol 41, No: 5, 2005.

Graphite Intercalation in the Graphite-$H_2SO_4$—R (R=$H_2O$, $C_2H_5OH$, $C_2H_5COOH$) Systems by O N Shornikova, N E Sorokina, N V Maksimova, and V V Avdeev Inorganic Materials, Vol. 41, No. 2, 2005, pp 120-126.

Intercalated graphite is a product formed from graphite flakes in which other chemical compounds have been intercalated between the stacked layers of the flaked crystalline structure. For example, bisulphate-intercalated product may be obtained by treatment of the graphite flakes with sulphuric acid in oxidising conditions. Many methods of intercalating graphite have been proposed including electrochemical and oxidation techniques. For example U.S. Pat. No. 4,350,576 teaches a method of intercalating graphite in which the graphite particles are placed in an anode compartment in an electrolytic solution and are subjected to electrical potential between the anode and a cathode while applying pressure to press the anode surface against the graphite particles.

In a preferred method of making an intercalated graphite suitable for the present invention, a mixture of the graphite and a precursor of the desired intercalating material is formed, and the mixture is arranged between an anode and a cathode. The mixture may be of one or more phases, preferably a solid/liquid mixture. The precursor is preferably sulphuric acid so that the intercalated material is graphite bisulphate but it will be appreciated that other precursors may be used, if desired. Examples are phosphoric acid, nitric acid, trifluoroacetic acid and perchloric acid, but many other compounds capable of chemical insertion might also be used.

The proportions of graphite to precursor in the mixture can vary, for example, from 25% to 75% by weight, preferably 45% to 55% by weight. The graphite may be of a size from fine powder to large flakes, e.g. up to 1 mm, but this is not critical.

EXAMPLES

A range of organic contaminants have been shown to be removed by adsorption onto bi-sulphate intercalated graphite (both flake and powdered). These include both laboratory prepared solutions (Examples 1, 2, 5 & 6) and industrial effluents (Examples 3, 4, 7 & 8). Experiments showed that equilibrium was established between the liquid and the solid phases within around 15 minutes and so all trials involved mixing the adsorbent and liquid for a period of 30 minutes to ensure that equilibrium was achieved.

Example 1

Colour removal using the powdered bi-sulphate intercalated graphite was demonstrated by removing organic dyes from deionised water spiked with 100 mg/l of organic dye. Adsorption isotherms have been generated for two organic dyes by adding varying quantities of bi-sulphate intercalated graphite to the dye solutions. It was found that these isotherms could be modelled using the Freundlich model, where Q is the solid phase equilibrium loading (mg/g) and $C_e$ is the liquid phase equilibrium concentration (mg/l). Table 1 shows the Freundlich adsorption isotherms generated using a number of different dyes.

TABLE 1

Freundlich equations for dye adsorption

| Organic dye | Freundlich Isotherm | Comments |
| --- | --- | --- |
| Crystal violet | $Q = 1.362\ C_e^{0.2086}$ | pH 7 |
| Crystal Violet | $Q = 1.458\ C_e^{0.172}$ | pH 3 |
| Reactive Black 5 | $Q = 0.731\ C_e^{0.3171}$ | pH 11 |
| Reactive Black 5 | $Q = 0.79\ C_e^{0.2878}$ | pH 3 |
| Reactive Black 5 | $Q = 0.561\ C_e^{0.3156}$ | pH 6.5 |
| Crystal Violet | $Q = 1.459\ C_e^{0.2086}$ | In presence of NaCl |

Example 2

Colour removal using the flake bi-sulphate intercalated graphite was demonstrated by removing crystal violet dye from deionised water spiked at 100 mg/l. The Freundlich adsorption isotherm was created as in Example 1 and was found to be $Q=0.34\ C_e^{0.0547}$.

Example 3

Colour removal from an industrial effluent was demonstrated by adding powdered bi-sulphate intercalated graphite to a dyehouse effluent. An addition of 23 g per 100 ml of effluent removed virtually all of the colour (over 97%) and 78% of the Chemical Oxygen Demand (COD).

Example 4

Addition of 10 g/l of flake bi-sulphate intercalated graphite to a cutting oil waste removed 12.2% of the COD.

Example 5

Atrazine could be removed from a 10 µg/l solution to below 0.5 µg/l by the addition 7 g/l of powdered bi-sulphate intercalated graphite.

Preferential adsorption of chlorinated organics has been demonstrated by testing both laboratory mixtures (Example 6) and industrial effluents (Examples 7 & 8) containing chlorinated and non-chlorinated effluents.

Example 6

A laboratory solution containing approximately 60 mg/l of phenol, 4-chlorophenol, 2,4-dichlorophenol and 2,4,6- trichlorophenol was prepared. A range of known masses of powdered bi-sulphate intercalated graphite was mixed with this solution for 30 minutes to achieve equilibrium. The solution was vacuum filtered and analysed by GC. Table 2 below shows the removal rates for each contaminant, demonstrating that the more chlorinated tri-chloro-phenol is most strongly adsorbed, with di-chloro- and mono-chloro-phenol having some adsorption and little phenol adsorption.

TABLE 2

% removal of chlorinated and non-chlorinated phenol at different dose rates

| Dose rate (g) | Tri-chlorophenol | Di-chlorophenol | Mon-chlorophenol | Phenol |
|---|---|---|---|---|
| 0.00 | 0.00 | 0.00 | 0.00 | 0.00 |
| 0.50 | 21.66 | 18.18 | 5.36 | 6.34 |
| 1.26 | 54.26 | 30.99 | 7.30 | 6.24 |
| 2.36 | 81.54 | 49.96 | 16.61 | 7.37 |
| 4.77 | 100.00 | 78.57 | 39.82 | 12.43 |
| 7.85 | 100.00 | 91.59 | 69.78 | 25.00 |

Example 7

An industrial effluent which contained a high organic content (filtered COD 11,070 mg/l), with low levels of chlorinated compound of which 98% was dichloromethane (DCM-137 mg/l) was treated. 100 cm³ of this effluent was mixed with 12.5 g of powdered bi-sulphate intercalated graphite and was mixed for 30 minutes.

Analysis of these before and after sample for COD and DCM was undertaken (Table 3). These results show that the majority of the DCM is removed (96.7%) whilst only 17.7% of the general organic content (as measured by COD) is removed.

TABLE 3

COD and DCM removal from an industrial effluent

| | COD (mg/l) | DCM (mg/l) |
|---|---|---|
| Before | 11,070 | 137 |
| After | 9,115 | 4.49 |
| % Removal | 17.7 | 96.7 |

Example 8

An industrial effluent containing quantities of trichlorophenol (TCP) as well as a high organic load (CODs in excess of 25,000 mg/l) was treated. 250 ml of the effluent was mixed with 17.7 g of flake bi-sulphate intercalated graphite for 30 minutes. 81.5% of the TCP, whilst only 4.1% of the COD was removed (Table 4).

TABLE 4

Trichloroprienol and COD removals from an industrial effluent

| | TCP (mg/l) | COD (mg/l) |
|---|---|---|
| Before | 32.50 | 27.15 |
| After | 6.01 | 26.05 |
| % Removal | 81.5 | 4.1 |

While the invention has been described with reference to the treatment of liquids, the adsorbents may be used in the treatment of gasses or air to remove odours and other contaminants. This can be accomplished either directly, or indirectly by first dissolving the contaminant in a liquid which is then contacted by the adsorbent to separate the contaminant therefrom. Apparatus of the kind disclosed in International Application No. PCT/GB2007/001544 referred to above, can be used for this purpose.

The invention claimed is:

1. A method of treating contaminated water comprising:
   providing intercalated graphite in the form of unexpanded flakes, wherein a wet bed of said flakes has a conductivity of at least 0.32 $\Omega^{-1}$ cm$^{-1}$;
   providing contaminated water containing at least one organic contaminant;
   contacting said contaminated water with said graphite; and
   adsorbing said at least one organic contaminant from the contaminated water with said graphite.

2. The method claimed in claim 1 wherein the graphite has been intercalated with a precursor selected from sulphuric acid, phosphoric acid, nitric acid, trifluoroacetic acid, and perchloric acid.

3. The method claimed in claim 2 wherein the precursor is sulphuric acid.

4. The method of claim 1, further comprising the step of removing said at least one contaminant from said graphite by passing an electrical current through a bed of said graphite after said step of absorbing.

* * * * *